(12) United States Patent
Liang et al.

(10) Patent No.: US 12,540,112 B2
(45) Date of Patent: Feb. 3, 2026

(54) CRYSTAL FORM I OF CURCUMIN DERIVATIVE, PREPARATION METHOD THEREFOR AND APPLICATION THEREOF

(71) Applicants: WENZHOU MEDICAL UNIVERSITY, Wenzhou (CN); Wenzhou Guangcheng Biotech Co. Ltd., Wenzhou (CN)

(72) Inventors: Guang Liang, Wenzhou (CN); Wenqi Wu, Wenzhou (CN); Jianchang Qian, Wenzhou (CN); Di Wu, Wenzhou (CN); Yi Wang, Wenzhou (CN)

(73) Assignees: WENZHOU MEDICAL UNIVERSITY, Wenzhuo (CN); WENZHOU GUANGCHENG BIOTECH CO., LTD., Wenzhou (CN)

( * ) Notice: Subject to any disclaimer, the term of this patent is extended or adjusted under 35 U.S.C. 154(b) by 864 days.

(21) Appl. No.: 17/729,901

(22) Filed: Apr. 26, 2022

(65) Prior Publication Data

US 2022/0251017 A1    Aug. 11, 2022

Related U.S. Application Data

(63) Continuation of application No. PCT/CN2020/113217, filed on Sep. 3, 2020.

(30) Foreign Application Priority Data

Nov. 7, 2019 (CN) .......................... 201910831988.9

(51) Int. Cl.
*C07C 49/255* (2006.01)
(52) U.S. Cl.
CPC ........ *C07C 49/255* (2013.01); *C07B 2200/13* (2013.01)

(58) Field of Classification Search
CPC . C07C 49/255; C07C 49/697; C07B 2200/13; A61P 3/10; A61P 9/12; A61P 13/12; A61P 31/20; A61P 37/08
See application file for complete search history.

(56) References Cited

FOREIGN PATENT DOCUMENTS

| CN | 110615733 A | 12/2019 |
|---|---|---|
| WO | 2011029359 A1 | 3/2011 |
| WO | 2012163088 A1 | 12/2012 |

OTHER PUBLICATIONS

Ying Zhang et al., Z. Kristallogr. NCS 230 (2015) 271-272, made of record on the IDS (Year: 2015).*

(Continued)

*Primary Examiner* — Clinton A Brooks
*Assistant Examiner* — Izabela Schmidt
(74) *Attorney, Agent, or Firm* — Jiwen Chen; Joywin IP Law PLLC

(57) ABSTRACT

Provided are a crystal form I of a curcumin derivative (C66), a preparation method therefor and an application thereof. An X-ray powder diffraction pattern of the crystal form I contains following characteristic peaks for 2θ reflection angle determination: 8.4±0.2°, 11.5±0.2°, 13.1±0.1°, 16.6±0.2°, 18.8±0.1°, and 21.2±0.1°. No sharp diffraction peak exists at 33.5±0.2° and 38.1±0.2°. A structure of the curcumin derivative is shown in formula (I) as follows:

(Continued)

9 Claims, 2 Drawing Sheets

(56) References Cited

OTHER PUBLICATIONS

Hadzi-Petrushev, et al., Life Sciences 197 (2018) 10-18, made of record on the IDS (Year: 2018).*
Yong Pan, J. Cell, Mol. Med. vol 18, No. 2, 2014 pp. 231-241, made of record on the IDS (Year: 2014).*
Chayen J. Appl. Cryst. (2009). 42, 743-744 (Year: 2009).*
Heriot-Watt University (Guide to Crystal Growing, Jan. 31, 2002). (Year: 2002).*
Internation Search Report of PCT/CN2020/113217, Mailed Dec. 4, 2020.
Pan, Yong et al., "Inhibition of MAPK-mediated ACE expression by compound C66 prevents STZ-induced diabetic nephropathy", J. Cell. Mol. Med., vol. 18, No. 2, Dec. 11, 2013, pp. 231-241.
Zhang, Ying et al., "Crystal structure of (2E, 6E)-2, 6-bis[2-(trifluoromethyl)benzylidene]cyclohexanone, C22H16F6O", Z. Kristallogr. NCS, vol. 230, Jul. 20, 2015, pp. 271-272.
Hadzi-Petrushev, Nikola et al., "Comparative study of the antioxidant properties of monocarbonyl curcumin analogues C66 and B2BrBC in isoproteranol induced cardiac damage", Life Sciences, vol. 197, Jan. 31, 2018, pp. 10-18.
Liang, Guang et al., "Exploration and synthesis of curcumin analogues with improved structural stability both in vitro and in vivo as cytotoxic agents", Bioorganic & Medicinal Chemistry, vol. 17, Nov. 1, 2008, pp. 2623-2631.

* cited by examiner

CRYSTAL FORM I OF CURCUMIN DERIVATIVE, PREPARATION METHOD THEREFOR AND APPLICATION THEREOF

CROSS REFERENCE

The present application is a continuation-application of International (PCT) Patent Application No. PCT/CN2020/113217, filed on Sep. 3, 2020, which claims priority of Chinese Patent Application No. 201910831988.9, filed on Nov. 7, 2019, the entire contents of which are hereby incorporated by reference in its entirety.

TECHNICAL FIELD

The present disclosure relates to the field of medicine technologies, and in particular to a crystal form I of a curcumin derivative, a preparation method therefor and an application thereof.

BACKGROUND

Diabetes and its chronic complications have seriously affected human health and quality of life. In recent years, the number of diabetes patients has been on the rise. The incidence of diabetes in all age groups in the world was 2.8% in 2000 and is expected to be 4.4% by 2030. The number of people suffering from diabetes will increase from 171 million in 2000 to 250 million at present and is expected to rise to 333 million in 2030. In recent years, the incidence of diabetes in China has been increasing. According to the epidemiological survey of the Diabetes Branch of the Chinese Medical Association, the number of people suffering from diabetes in China has reached 0.93 billion, ranking first in the world, making the prevention and treatment of such diseases an important issue related to national health and social development.

In the case of hyperglycemia, a series of pathological changes and damages will occur to multiple tissues and organs of the body, resulting in a variety of complications. Diabetic nephropathy (DN) is one of the important complications of diabetes and one of the main causes of death in diabetic patients. Whether for Type 1 or Type 2 diabetes, approximately 40% of patients have kidney damage. Due to the insidious onset of Type 2 diabetes, 5% of patients have diabetic kidney damage at the time of diabetes diagnosis. The onset of diabetic nephropathy is insidious and not easily detected in the early stage, and the kidney lesions are irreversible when symptoms appear. Prolonged diabetes causes destruction of the filtration function of the kidneys, which initially manifests as microalbuminuria. With the prolongation of the disease, urine protein increases and the kidney's ability to eliminate toxins from the blood gradually decreases, eventually developing into end-stage renal disease (ESRD), people suffering from which can only rely on hemodialysis or kidney transplantation to maintain life. In the United States and western countries, diabetic nephropathy is the leading cause of ESRD; DN accounts for about 15-20% of ESRD patients in China. With the economic development of China, the increasing incidence of diabetes and the aging of the social population, the prevalence and mortality of diabetes and its complications will continue to climb in the coming period, becoming one of the most prominent problems in the field of health in China.

However, the current treatments for diabetic nephropathy are still unsatisfactory. In the early stage of diabetic nephropathy, the treatment means still focus on lowering blood sugar, blood pressure and blood lipid for the treatment of diabetes. In the late stage of diabetic nephropathy, dialysis therapy and kidney transplantation for the treatment of nephropathy are the main treatments. Among them, the treatment for renal failure in the late stage has been hopeless. In the early treatment of diabetic nephropathy, the current treatment may delay the kidney damage caused by diabetes, but it cannot reverse the kidney damage that has already occurred, while it still cannot stop the progression of nephropathy to ESRD. Angiotensin-converting enzyme inhibitors (ACE I) and angiotensin II receptor blockers are also applied clinically to lower blood pressure and improve hemodynamics to improve DN, which can stop the progression of nephropathy in 50-60% of patients with microalbuminuria. In recent years, although there have been many intervention experiments done for each major aspect of DN pathogenesis, such as aldose reductase inhibitors, protein kinase C receptor blockers, and cytokine blockers targeting the pathogenesis of DN. Although most of them have achieved satisfactory results in animal experiments, while most of them have not been practically applied in the validation of DN in humans due to unsatisfactory results or excessive side effects. Therefore, it is of great practical significance and social value to propose new mechanisms and targets for the treatment of early diabetic nephropathy, and to develop new drugs for the treatment of early diabetic nephropathy, which have great application prospects and market potential.

Our project team has done a lot of research in the early stage, and designed and synthesized hundreds of curcumin structural analogues with curcumin as the lead compound, from which we screened and found that a new curcumin analogue C66 has good pharmacological efficacy in alleviating diabetic nephropathy. We have completed a large number of pharmacological mechanism studies and evaluation of the efficacy of C66 and found that C66 has a high degree of efficacy.

C66 is a compound with full intellectual property rights, which possesses a novel pharmacological mechanism different from the current diabetic therapeutic drugs, dual-targeting and regulating the endocrine and chronic inflammatory signaling networks that play an important role in the development of diabetic nephropathy. The chemical structural formula of C66 is shown below:

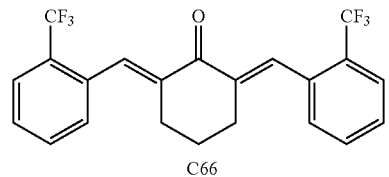 [SMILES: O=C1/C(=C/c2ccccc2C(F)(F)F)CCC/C1=C\c1ccccc1C(F)(F)F ; "C66"]

C66

Different crystal forms of drugs are not only different in terms of thermodynamic properties such as melting point, but more importantly, the different crystal forms of drugs have different crystal morphology (lamellar, flake, needle, etc.), physical stability, dissolution rate, solubility, etc. These physicochemical properties have a great impact on the drug formulation process, bioavailability and efficacy of the drug. Therefore, it is very important to screen for suitable drug-forming crystals in dosage form development.

C66 is currently in the development stage, and we have not reported any crystal form for the time being. In previous papers (*Exploration and synthesis of curcumin analogues with improved structural stability both in vitro and in vivo as* cytotoxic agents. *Bioorg. Med. Chem.*, 2009, 17: 2623-2631, and *Inhibition of LPS-induced Production of Inflammatory Factors in the Macrophages by Mono-carbonyl Analogues of Curcumin. Journal of Cellular and Molecular Medicine*, 2009, 13(9B):3370-9), the melting point of the recorded curcumin derivative is 107-108° C., which is different from the melting point (111.5±0.5° C.) of crystal form I in the present disclosure. Therefore, the previously reported one is not the crystal form I in the present disclosure.

SUMMARY OF THE DISCLOSURE

The present disclosure provides a crystal form I of a curcumin derivative, a preparation method therefor and an application thereof. The crystal form I of the curcumin derivative is stable and suitable for drug formation.

A crystal form I of a curcumin derivative, an X-ray powder diffraction pattern of which contains following characteristic peaks for 2θ reflection angle determination: 8.4±0.2°, 11.5±0.2°, 13.1±0.1°, 16.6±0.2°, 18.8±0.1°, and 21.2±0.1°; wherein no sharp diffraction peak exists at 33.5±0.2° and 38.1±0.2°;

a structure of the curcumin derivative is shown in formula (I) as follows:

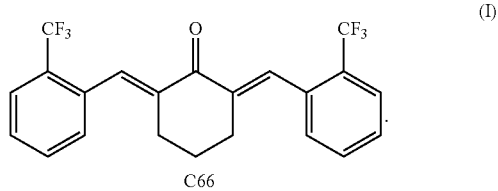 [SMILES: O=C1/C(=C/c2ccccc2C(F)(F)F)CCC/C1=C\c1ccccc1C(F)(F)F ; "C66"]

(I)

C66

During study, we found five crystalline forms of C66, denoted as I, II, III, IV, and V. The solids of crystal form I are present in 96-well solvent crystallization method screening, solvent transcrystallization, and other conditions. The crystal form II is obtained by binary mixed solvent recrystallization in 96-well plate method, such as in binary mixed solvents of methanol and acetonitrile, isopropanol and ethyl propyl acetate, methyl tert-butyl ether and n-heptane. The crystal form III is found by recrystallization in a mixture of ethanol and 1,4-dioxaohexane and a single solvent of 1,4-dioxaohexane in a 96-well plate screen, and it is worth noting that the melting point of this crystal form is 107-108° C., which is consistent with our previously reported melting point. The crystal form IV is obtained by recrystallization in a binary mixture of ethyl acetate and n-heptane, methyl isobutyl ketone and n-heptane, and a single solvent of methyl isobutyl ketone during the 96-well screening process; The crystal form V is also obtained by recrystallization in a binary mixture of 1,4-dioxaohexane and n-heptane, and acetonitrile and n-heptane during the 96-well screening process. Subsequently, the obtained crystal forms are upscaled one by one. The reproducibility of the up-scaling of crystal forms II~V under same conditions is very poor, and only crystal form I can be reproduced well. Therefore, the crystal form I is easily prepared in large quantities and most suitable as a drug-forming crystal form.

In some embodiments, a 2θ reflection angle of a relative intensity maximum peak of the crystal form I is 18.8±0.1°.

In some embodiments, the X-ray powder diffraction pattern is shown in FIG. 1.

In some embodiments, a melting point of the crystal form I is 111.5±0.5° C.

The present disclosure further provides a preparation method for the crystal form I of the curcumin derivative, comprising: dissolving the curcumin derivative in an organic solvent, filtering with a 0.22 μm filter to obtain a filtrate, slowly evaporating the filtrate at room temperature and humidity, precipitating crystals, filtering, and drying to obtain the crystal form I;

wherein the organic solvent comprises one or more of methanol, ethanol, acetone, isopropanol, ethyl acetate, toluene, acetonitrile, methyl tert-butyl ether, isopropyl acetate, heptane, and methyl isobutyl ketone.

In some embodiments, the organic solvent is methanol or ethanol.

In some embodiments, the organic solvent is a mixture of methanol and ethanol, and a volume ratio of the methanol and the ethanol is 1:0.5-1.5.

The present disclosure further provides a preparation method for the crystal form I of the curcumin derivative, comprising: dissolving the curcumin derivative in a first organic solvent, filtering with a 0.22 μm filter to obtain a filtrate, mixing the filtrate with an equal volume of a second organic solvent to obtain a mixture, slowly evaporating the mixture at room temperature and humidity, precipitating crystals, filtering, and drying to obtain the crystal form I;

wherein the first and second organic solvents comprise one or more of methanol, ethanol, acetone, isopropanol, ethyl acetate, toluene, 1,4-dioxaohexane, acetonitrile, methyl tert-butyl ether, isopropyl acetate, heptane, and methyl isobutyl ketone.

The present disclosure further provides an application of the crystal form I of the curcumin derivative wherein the crystal form I of the curcumin derivative is configured for treatment or prevention of diabetic nephropathy, chronic glomerulonephritis, nephrotic syndrome, IgA nephropathy, diabetic nephropathy, membranous nephropathy, hypertensive nephropathy, allergic purpura nephritis, hepatitis B-associated nephritis, lupus nephritis, post-transplantation and other primary and secondary chronic kidney diseases.

The present disclosure further provides a pharmaceutical formulation, comprising the crystal form I of the curcumin derivative and one or more pharmaceutically acceptable inert non-toxic carriers or excipients.

Compared with the prior art, the beneficial effects of the present disclosure are embodied in the following:

The present disclosure provides a previously unreported crystal form, which can be prepared in large quantities compared with other crystal forms. In addition, it has the advantages of better fluidity, weak moisture attraction, good stability, etc., and has better drug-forming properties.

DETAILED DESCRIPTION

Specific embodiments of the present disclosure are illustrated with reference to the following examples, which are intended to illustrate the present disclosure, but not to limit the present disclosure in any way.

Embodiment 1: Preparation of Crystal Form I of Curcumin Derivative (C66)

2.4 g of curcumin derivative (C66) is added to 60 mL of methanol; after stirring for 2 hours at room temperature, 40 mL therefrom is taken and filtered with a 0.22 μm filter to obtain a filtrate. The filtrate is placed in a fume hood for evaporating naturally at room temperature and atmospheric environment (temperature: 25° C. to 35° C., relative humidity: 35% to 65%; reference to thereto below is also with the same parameters). A precipitated solid is suction filtered and dried in vacuum. The obtained solid is subjected to XRPD, DSC, TGA, etc.

Embodiment 2: Preparation of Crystal Form I of Curcumin Derivative (C66)

2.0 g of curcumin derivative (C66) is added to 50 mL of acetone; after stirring for 2 hours at room temperature, it is filtered with a 0.22 μm filter to obtain a filtrate. The filtrate is placed in a fume hood for evaporating naturally at room temperature and atmospheric environment. A precipitated solid is suction filtered and dried in vacuum. The obtained solid is subjected to XRPD, DSC, TGA, etc.

Embodiment 3: Preparation of Crystal Form I of Curcumin Derivative (C66)

3.0 g of curcumin derivative (C66) is added to 30 mL of methanol; after stirring for 2 hours at room temperature, it is filtered with a 0.22 μm filter to obtain a filtrate. 20 mL of the filtrate is taken and added to 20 mL of ethanol to obtain a mixture. The mixture is mixed well and placed in a fume hood for evaporating naturally at room temperature and atmospheric environment. A precipitated solid is suction filtered and dried in vacuum. The obtained solid is subjected to XRPD, DSC, TGA, etc.

Embodiment 4: X-Ray Powder Diffraction Spectrum of Crystal Form I

Measurement instrument: SmartLab-3kw powder X-ray diffractometer, Rigaku Corporation.

Measurement Conditions:

Scanning mode: continuous scanning Drive mode: 0-2θ linkage

Start angle: 3° End angle: 50°

Scanning speed: 0.02°/sec Sampling time: 1 sec

Target material: Cu Tube voltage: 40 kV

Tube current: 30 mA

The sample is transferred to a 0 background XRPD sample tray and gently ground to make the surface of the test sample smooth and even.

Figure 1:
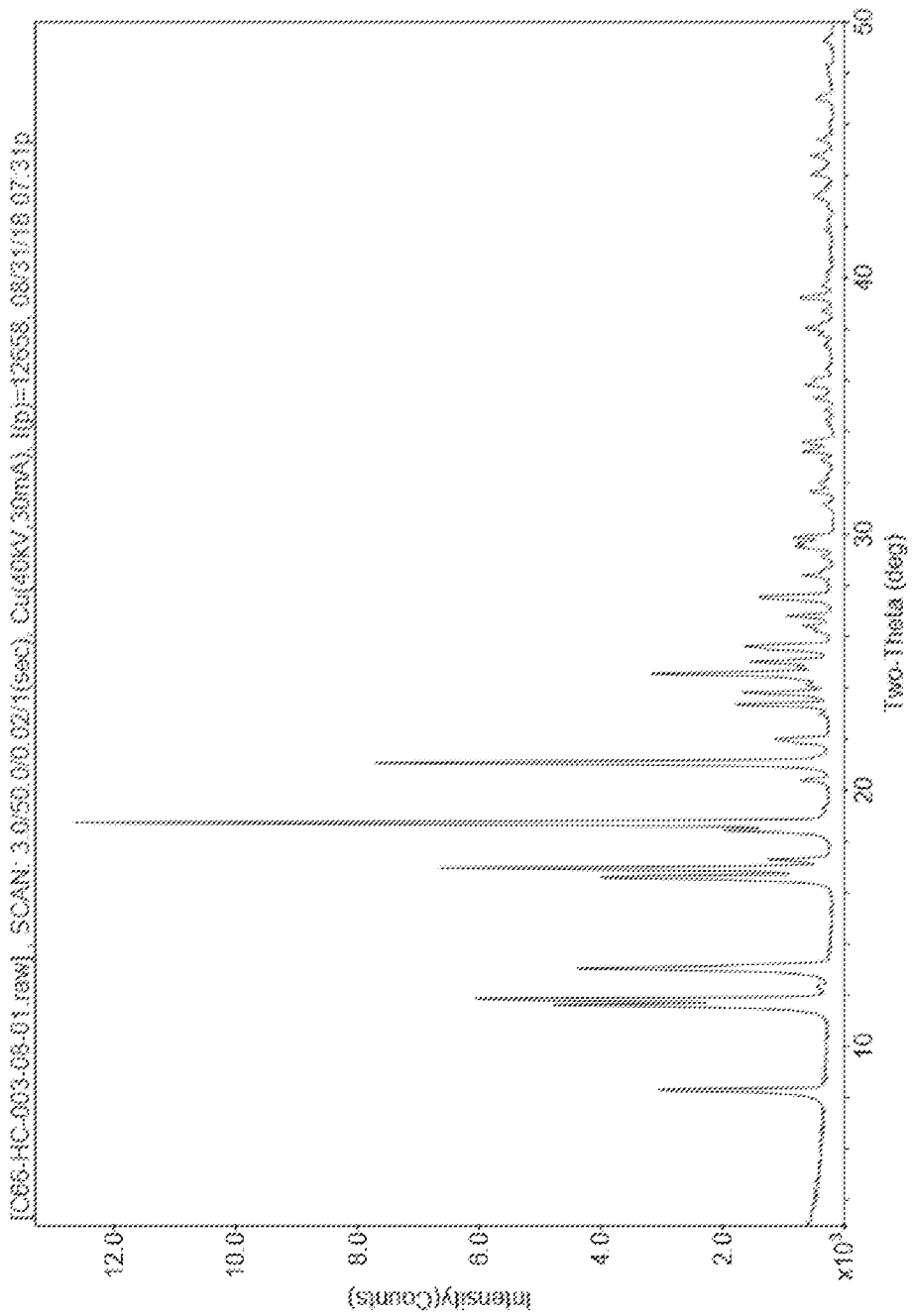
FIG. 1 is an X-ray powder diffraction pattern of a crystal form I of a curcumin derivative (C66) of the present disclosure.

FIG. 1 is an X-ray powder diffraction pattern of the crystal form I prepared in Embodiment 1. The X-ray diffraction patterns of the crystal form I of the curcumin derivatives prepared in Embodiments 2 and 3 are each the same as that in FIG. 1. The XRPD data measured in Embodiments 1, 2, and 3 are listed in Table 1.

TABLE 1

X-Diffraction measurement data of crystal form I of curcumin derivative (C66)

| Embodiment | 1 | 2 | 3 |
|---|---|---|---|
| Powder X-ray diffraction - characteristic peak ± 0.2 (2θ) | 8.42 | 8.30 | 8.40 |
| | 11.68 | 11.54 | 11.72 |
| | 11.94 | 11.82 | 11.94 |
| | 13.16 | 13.14 | 13.20 |
| | 16.74 | 16.56 | 16.74 |
| | 17.06 | 17.06 | 17.04 |
| | 18.84 | 18.84 | 18.84 |
| | 21.18 | 21.12 | 21.22 |
| | 22.10 | 22.03 | 22.10 |
| | 23.44 | 23.40 | 23.44 |
| | 23.90 | 23.86 | 23.90 |
| | 24.64 | 24.64 | 24.64 |
| | 25.14 | 25.04 | 25.14 |
| | 25.68 | 25.70 | 25.68 |

Embodiment 5: TGA Pattern of Crystal Form I

Measurement instrument: TGA Q50 (V20.8 Build 34), American TA instrument.

Measurement conditions: Approximately 2.0-3.0 mg of sample is placed in a balanced alumina sample pan, and the mass of the sample is automatically weighed in the TGA heating furnace. The sample is heated to 400° C. at a rate of 10° C./min. During the test, the nitrogen flow rate in the balance chamber is 40 mL/min and in the sample chamber is 60 mL/min.

The measurement results of Embodiments 1, 2, and 3 are shown in Table 2.

TABLE 2

Drying loss results of Embodiments 1, 2, and 3

| Sample batch No. | Embodiment 1 | Embodiment 2 | Embodiment 3 |
|---|---|---|---|
| Drying weight loss % | 0.26 | 0.20 | 0.10 |

It can be seen from Table 2 that the drying loss of the three batches of crystal form I is far less than 1%. Therefore, the three batches of crystal form I may be considered as crystal-free.

Embodiment 6: Preparation and Characterization of Crystal Forms II, III, IV, and V of Curcumin Derivatives (C66)

Figure 2:
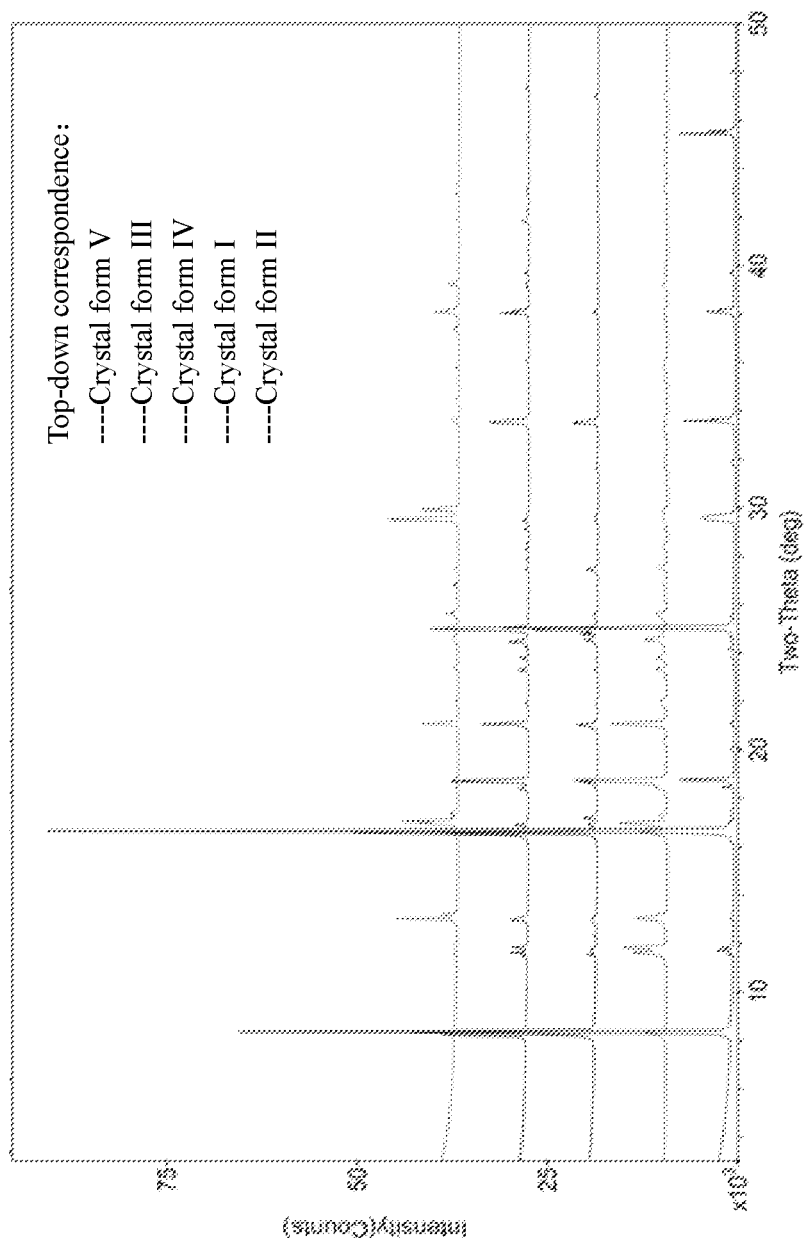
FIG. 2 is a comparison of X-ray powder diffraction patterns of 5 crystal forms of a curcumin derivative (C66) of the present disclosure.

240 mg of curcumin derivative (C66) is added to 6.0 mL of solvent 1; after stirring for 2 hours at room temperature, 4.0 mL therefrom is taken and filtered with a 0.22 μm filter to obtain a filtrate. The filtrate is reserved for later use. 200 μL of the filtrate is added to 200 μL of solvent 2, well mixed, and placed in a fume hood for evaporating naturally at room temperature and atmospheric environment (temperature: 25° C. to 35° C., relative humidity: 35% to 65%; reference to thereto below is also with the same parameters). A precipitated solid is suction filtered and dried in vacuum. The obtained solid is subjected to XRPD test. The solvents 1 and 2 are shown in Table 3. The XRPD results and the comparison with the form I are shown in FIG. 2.

TABLE 3

Solvents 1 and 2 adopted in the preparation of different crystal forms

| Crystal form | Solvent 1 | Solvent 2 |
| --- | --- | --- |
| II | Methanol | Acetonitrile |
| III | 1,4-Dioxaohexane | 1,4-Dioxaohexane |
| IV | Ethyl acetate | n-Heptane |
| V | Acetonitrile | n-Heptane |

It can be seen from FIG. 2 that the XRPD patterns of different crystal forms are obviously different. XRPD can be applied as an effective means to identify crystal forms.

Embodiment 7: Scale-Up Preparation of Crystal Forms II, III, IV, and V of Curcumin Derivatives The method and operations are the same as in Embodiment 6, but the volumes of solvents 1 and 2 are both changed to 800 μL. After mixing, the mixture is placed under room temperature atmosphere environment for evaporating naturally. A precipitated solid is suction filtered and dried in vacuum. The obtained solid is subjected to XRPD test to identify the crystal form. Table 4 shows the results of the solvents 1 and 2 and the crystal form identified by XRPD.

TABLE 4

Scale-up preparation and characterization results of crystal forms

| Target crystal form | Solvent 1 | Volume of solvent 1 | Solvent 2 | Volume of solvent 2 | XRPD Identification |
| --- | --- | --- | --- | --- | --- |
| II | Methanol | 200 uL * 4 | Acetonitrile | 200 uL * 4 | Preparation failed |
| III | 1,4-Dioxaohexane | 200 uL * 4 | 1,4-Dioxaohexane | 200 uL * 4 | Preparation failed |
| IV | Ethyl acetate | 200 uL * 4 | n-Heptane | 200 uL * 4 | Preparation failed |
| V | 1,4-Dioxaohexane | 200 uL * 4 | n-Heptane | 200 uL * 4 | Preparation failed |

It can be seen from Table 4 that even if the preparation method is the same as that of Embodiment 6, the four solutions cannot be prepared to obtain the target crystal form after 4 times of volume enlargement. This indicates that it is difficult to prepare these four crystal forms by scaling up.

Embodiment 8: Large-Scale Preparation of Crystal Form I of Curcumin Derivative 23 g of sodium hydroxide is weighted and added with 2.3 L of water to obtain a 1% sodium hydroxide solution. The 1% sodium hydroxide solution is put into a 50 L reactor. 383 g 383 g of o-trifluoromethylbenzaldehyde is dissolved with 3.06 L of ethanol to obtain an ethanol solution of o-trifluoromethylbenzaldehyde, and the ethanol solution of o-trifluoromethylbenzaldehyde is added to the reactor with stirring. 107.9 g of cyclohexanone is dissolved in ethanol to obtain an ethanol solution of cyclohexanone, and the ethanol solution of cyclohexanone is added dropwise to the reactor. The color of the reaction liquid gradually changed to yellow, and solids are precipitated. After dropping is completed, the temperature is controlled at room temperature (25° C.±5° C.) to react for 3 hours, sampling is performed for TLC detection, and the reaction is monitored until the conversion of the raw materials is complete.

2.3 L of water is added to the reaction solution, stirred at about room temperature (25° C.±5° C.), and filtered to obtain a filter cake. The filter cake is stirred and dissolved with 4 L ethyl acetate, and added with 1.5 L water to wash and separate. The aqueous phase is extracted with 0.5 L ethyl acetate once. Organic phase combination is performed twice, and washing is performed once with 0.5 L saturated brine. 40 g activated carbon is added to the organic phase, stirred and decolorized for 1 h at room temperature (25° C.±5° C.), and filtered to obtain a filtrate. The filtrate is desolvated by distillation under reduced pressure (−0.08 Mpa-−0.1 MPa, 50° C.-55° C.) to obtain a yellow solid. 2 L n-heptane is added. The temperature is increased to 90° C.-100° C. for stirring and dissolving, then naturally cooled to 15° C.-25° C. for 1 h crystallization. Filtering is performed and an obtained filter cake is dried (60° C.-70° C.) for 12 h to obtain 415 g curcumin derivative. The curcumin derivative is identified as crystal form I by XRPD.

It can be seen that the crystal form I has good reproducibility when it is prepared on a large scale.

Embodiment 9: Fluidity Test (1) Angle of Repose Measurement

An iron stand configured to measure the angle of repose is placed in a horizontal position, a funnel is fixed on the iron stand, and a plastic receiving container is placed directly under the funnel. The crystal form I is added to the funnel to make the material flow down slowly from the funnel to form a cone shape. The height of the bottom of the funnel and the top of the flowed-down material is maintained at a height of about 2-4 cm. The measurement is repeated 5 times to calculate the average value.

TABLE 5

Measurement of angle of repose

| 1 | 2 | 3 | 4 | 5 | Average value |
| --- | --- | --- | --- | --- | --- |
| 41.30° | 40.86° | 42.93° | 41.87° | 42.02° | 41.80° |

The average angle of repose is 41.80°, and the crystal form I has good fluidity.

(2) Bulk Density and Tap Density Determination

The crystal form I is added to a measuring cylinder, and the weight and volume of the material added are calculated. A densitometer is used to tap and record the volume of the material after tapping.

TABLE 6

| Determination of bulk density and tap density | |
| --- | --- |
| M(g) | 29.85 |
| V(mL) | 44.0 |
| V-tapped(mL) | 34.5 |
| ρ(g/cm³) | 0.678 |
| ρ-tapped(g/cm³) | 0.865 |
| Carr index | 21.60 |

Note:
Carr index = (tap density − bulk density)/tap density × 100
The Carr index is 21.60, indicating that the compound has good fluidity.

In summary, the fluidity of crystal form I is acceptable, and it can be conveniently used in various formulation processes.

Embodiment 10: Moisture Absorption Determination

In this embodiment, the moisture absorption of crystal form I is investigated according to the Pharmacopoeia, and the details are as follows:
(1) 2 dry glass weighing bottles with stoppers (outer diameter of 50 mm, height of 30 mm) are taken and placed in a desiccator where a saturated solution of ammonium chloride is placed in a lower part. The weighing bottles are placed with open lips, the lid of the desiccator is closed, and the desiccator is placed in a constant temperature room at 25° C. and left overnight.
(2) after left overnight, the weighing bottles are taken out and accurately weighted, results of which are $m_1$ 1 and $m_1$ 2 respectively.
(3) an appropriate amount of the API sample is taken and laid flat in a weighed weighing bottle (the thickness of the sample is about 1 mm), and accurately weighted, results of which are $m_2$ 1 and $m_2$ 2 respectively.
(4) the weighing bottles are placed with open lips and placed with the the bottle caps in the desiccator with the saturated solution of ammonium chloride in the lower part, the lid of the desiccator is closed, and the desiccator is placed in a thermostat at 25° C. for 24 hours.
(5) after leaving for 24 hours, the weighing bottles are capped and accurately weighted, results of which are $m_3$ 1 and $m_3$ 2 respectively.
(6) the calculation formula for moisture absorption weight gain is as follows:

Weight gain percentage=100%×$(m_3-m_2)/(m_2-m_1)$

TABLE 7

| | Determination of moisture absorption | | | | |
| --- | --- | --- | --- | --- | --- |
| Sample batch No. | $m_1$ (mg) | $m_2$ (mg) | $m_3$ (mg) | Weight gain percentage (%) | Average value (%) |
| C66-HC-006-13-06 | 31795.48 | 33438.01 | 33440.82 | 0.17 | 0.16 |
| C66-HC-006-13-06 | 32486.79 | 34133.36 | 34135.88 | 0.15 | |

According to the results of the determination of moisture absorption, the compound has no or almost no moisture absorption.

Embodiment 11: Stability Determination

A certain amount of crystal form I (purity 99.72%) is weighted and put in a glass bottle, laid into a thin layer with a thickness of less than or equal to 5 mm, and placed under conditions of 25° C./60% RH, 40° C./75% RH, 60° C./5% RH and 25° C./92.5% RH (wrapped in aluminum foil and pierced). Samples are taken after 2 weeks to test the stability of the samples by XRPD and HPLC. The test results are shown in Table 8. It can be seen from the results that the crystal form I remains stable under all conditions, and the purity does not change significantly.

TABLE 8

| | Two-week stability test results | | | |
| --- | --- | --- | --- | --- |
| Stability condition | 25° C./60% RH/60% RH | 40° C./75% RH | 60° C./75% RH | 25° C./92.5% RH |
| Stability of crystalline shape | YES | YES | YES | YES |
| Purity | 99.70% | 99.70% | 99.68% | 99.72% |

What is claimed is:
1. A crystal form I of a curcumin derivative, an X-ray powder diffraction pattern of which contains following characteristic peaks for 2θ reflection angle determination: 8.4±0.2°, 11.5±0.2°, 13.1±0.1°, 16.6±0.2°, 18.8±0.1°, and 21.2±0.1°;
wherein no sharp diffraction peak exists at 33.5±0.2° and 38.1±0.2°;
a structure of the curcumin derivative is shown in formula (I) as follows:

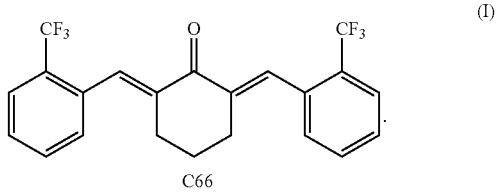 [SMILES: O=C1/C(=C/c2ccccc2C(F)(F)F)CCC/C1=C\c1ccccc1C(F)(F)F ; "C66"]

(I)

C66

2. The crystal form I of the curcumin derivative according to claim 1, wherein the X-ray powder diffraction pattern is shown in FIG. 1.
3. The crystal form I of the curcumin derivative according to claim 1, wherein a 2θ reflection angle of a relative intensity maximum peak of the crystal form I is 18.8±0.1°.
4. The crystal form I of the curcumin derivative according to claim 1, wherein a melting point of the crystal form I is 111.5±0.5° C.
5. The crystal form I of the curcumin derivative according to claim 1, wherein the X-ray powder diffraction pattern contains following characteristic peaks:
8.42±0.2°, 11.68±0.2°, 11.94±0.2°, 13.16±0.2°, 16.74±0.2°, 17.06±0.2°, 18.84±0.2°, 21.18±0.2°, 22.10±0.2°, 23.44±0.2°, 23.90±0.2°, 24.64±0.2°, 25.14±0.2°, and 25.68±0.2°; or
8.30±0.2°, 11.54±0.2°, 11.82±0.2°, 13.14±0.2°, 16.56±0.2°, 17.06±0.2°, 18.84±0.2°, 21.12±0.2°, 22.03±0.2°, 23.40±0.2°, 23.86±0.2°, 24.64±0.2°, 25.04±0.2°, and 25.70±0.2°; or
8.40±0.2°, 11.72±0.2°, 11.94±0.2°, 13.20±0.2°, 16.74±0.2°, 17.04±0.2°, 18.84±0.2°, 21.22±0.2°, 22.10±0.2°, 23.44±0.2°, 23.90±0.2°, 24.64±0.2° 0.2°, 25.14±0.2°, and 25.68±0.2.
6. A preparation method for a crystal form I of a curcumin derivative, wherein an X-ray powder diffraction pattern of the crystal form I contains following characteristic peaks for 2θ reflection angle determination: 8.4±0.2°, 11.5±0.2°, 13.1±0.1°, 16.6±0.2°, 18.8±0.1°, and 21.2±0.1°;
   wherein no sharp diffraction peak exists at 33.5±0.2° and 38.1±0.2°;
   a structure of the curcumin derivative is shown in formula (I) as follows:

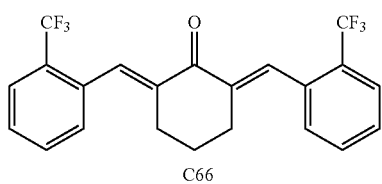

C66 (I)

the preparation method comprises:
   dissolving the curcumin derivative in an organic solvent, filtering with a 0.22 μm filter to obtain a filtrate, slowly evaporating the filtrate at room temperature and humidity, precipitating crystals, filtering, and drying to obtain the crystal form I;
   wherein the organic solvent comprises one or more of methanol, ethanol, acetone, isopropanol, ethyl acetate, toluene, acetonitrile, methyl tert-butyl ether, isopropyl acetate, heptane, and methyl isobutyl ketone.

7. The preparation method according to claim 6, wherein the organic solvent is methanol or ethanol.

8. The preparation method according to claim 6, wherein the organic solvent is a mixture of methanol and ethanol, and a volume ratio of the methanol and the ethanol is 1:0.5-1.5.

9. A preparation method for a crystal form I of a curcumin derivative, wherein an X-ray powder diffraction pattern of the crystal form I contains following characteristic peaks for 2θ reflection angle determination: 8.4±0.2°, 11.5±0.2°, 13.1±0.1°, 16.6±0.2°, 18.8±0.1°, and 21.2±0.1°;
   wherein no sharp diffraction peak exists at 33.5±0.2° and 38.1±0.2°;
   a structure of the curcumin derivative is shown in formula (I) as follows:

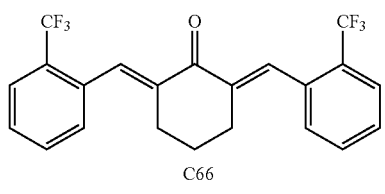

C66 (I)

the preparation method:
   dissolving the curcumin derivative in a first organic solvent, filtering with a 0.22 μm filter to obtain a filtrate, mixing the filtrate with an equal volume of a second organic solvent to obtain a mixture, slowly evaporating the mixture at room temperature and humidity, precipitating crystals, filtering, and drying to obtain the crystal form I;
   wherein the first organic solvent comprises one or more of methanol, ethanol, acetone, isopropanol, toluene, 1,4-dioxaohexane, methyl tert-butyl ether, isopropyl acetate, heptane, or methyl isobutyl ketone;
   the second organic solvent comprises one or more of methanol, ethanol, acetone, isopropanol, ethyl acetate, toluene, 1,4-dioxaohexane, acetonitrile, methyl tert-butyl ether, isopropyl acetate, or methyl isobutyl ketone.

* * * * *